United States Patent Office 3,170,960
Patented Feb. 23, 1965

3,170,960
PROCESS FOR PRODUCING DI-TERTIARY-
BUTYL NITRO PHENOLS
Gerd Leston, Pittsburgh, Pa., and Louis H. Schwartzman, deceased, late of Pittsburgh, Pa., by Doris F. Schwartzman, executrix, Baltimore, Md., assignors to Koppers Company, Inc., a corporation of Delaware
No Drawing. Filed Aug. 2, 1960, Ser. No. 47,111
4 Claims. (Cl. 260—622)

This invention relates generally to the production of aromatic nitro compounds and more particularly to the production of 2,6-dialkyl-4-nitrophenol.

Nitro phenols are chiefly used in chemical synthesis. It is common, for example, to reduce nitro phenols to produce amino phenols which in turn are useful as intermediates for dyes, pharmaceuticals, antioxidants, and photographic chemicals. A particularly interesting class of nitro phenols are the 2,6-dialkyl-4-nitro phenols, but such nitro phenols have been difficult to synthesize heretofore.

It has now been found that the 2,6-dialkyl-4-nitro phenols can be prepared in substantially quantitative yields by dealkylating the tertiary alkyl group of 2,6-dialkyl-4-tertiary-alkyl-4-nitro, 2,5-cyclohexadiene-1-one in an inert hydrocarbon medium with a boron trifluoride complex. The reaction is rapid; the 2,6-dialkyl-4-nitro phenol forming as a precipitate.

In accordance with this invention the 2,6-dialkyl-4-nitro phenol can be prepared from a phenol (a) by alkylating a phenol so that alkyl groups are provided for the 2,6 position and a t-alkyl group is provided in the 4 position, (b) nitrating the alkylated phenol to the 2,6-dialkyl-4-t-alkyl-4-nitro-2,5-cyclohexadiene-1-one, and (c) dealkylating or removing the tertiary-alkyl group that is in the 4 position in an inert medium with a boron trifluoride complex to produce the 2,6-dialkyl-4-nitro phenol.

As an illustration of the process of this invention, 2,6-di-t-butyl-4-nitro phenol may be prepared from phenol by alkylating the phenol with isobutylene, nitrating the trialkylated phenol, and dealkylating the resulting dienone with a boron trifluoride-phenol complex; the residue being recycled for alkylation after recovery of the nitro phenol as follows:

from 4 to 12 carbon atoms per molecule. Other processes of alkylation are known, however, and may be used to obtain the trialkyl phenols.

The alkyl groups at the 2,6 position in the trialkylated phenol may be any alkyl groups and may be the same or different alkyl groups. It is essential, though, that the alkyl group in the 4 position be a tertiary alkyl group so that this group can subsequently be removed without disturbing the other constituents. Examples of suitable tertiary alkyl groups are tertiary butyl, tertiary amyl, diisobutyl, triisobutyl, and the like. A tertiary butyl group is conveniently employed in the practice of this invention because isobutylene is inexpensive, is available in refining gases, and alkylates phenol readily in the presence of condensing agents such as aluminum chloride, zinc chloride, zirconium trichloride, boron trichloride, phosphoric acid, and sulfuric acid.

The 2,4,6 trialkyl phenol can be readily nitrated by adding concentrated nitric acid to a solution of the alkylated phenol in glacial acetic acid. The 2,4,6 trialkyl-4-nitro 2,5-diene-1-one (hereinafter referred to as dienone) forms as a precipitate.

The dealkylation of the tertiary alkyl group of the 4 position of the dienone is carried out in an inert solvent with a phenol or ether complex of boron trifluoride. The solvent should be an inert medium in which the nitro phenol is insoluble, and advantageously, the dienone is dissolved in the solvent and the dealkylation agent added thereto. The reaction is completed rapidly in such solvents and the nitro phenol forms as a precipitate; the reaction time at a temperature of 30–50° C. being about one to two minutes. Suitable solvents for use in this invention include hexane, petroleum ether, benzene, toluene, and halogenated hydrocarbons such as chlorobenzene, chloroform, trichloroethylene.

The boron trifluoride complexes for use in the practice of this invention are available commercially. The complexes can be prepared by passing gaseous boron trifluoride through a phenol or an ether. The phenolic portion of the complex may be mononuclear such as phenol, substituted phenols, such as cresols, xylenols, cresol phenols, halogenated phenols, or polynuclear such as naphthols and substituted naphthols. The ether of the ether complex may be an aliphatic ether or an aryl aliphatic ether.

Advantageously, the phenol complex of boron tri-

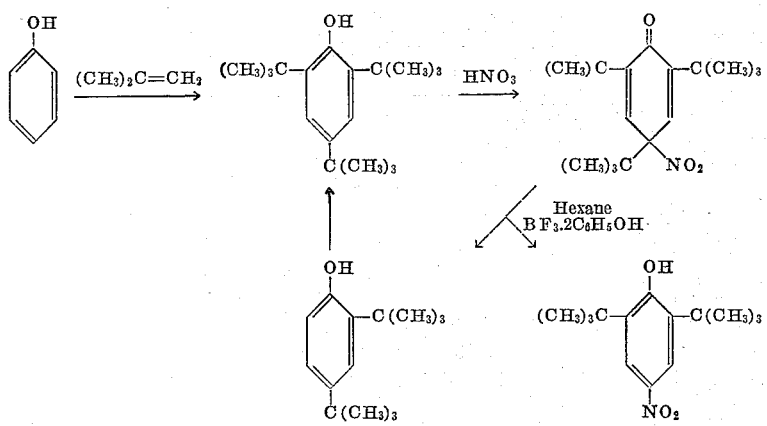

Trialkyl phenols for use with this invention are commercially available. Trialkyl phenols can readily be prepared directly from phenol as a phenol is readily alkylated by contacting it in the presence of small amounts of an acid condensing agent, such as sulfuric acid, with an alkylating agent, such as a tertiary olefin containing fluoride is used because a transalkylation apparently takes place. Thus, the reaction with the phenol complex proceeds better than with the aliphatic ether complex where no transalkylation occurs and the tertiary alkyl group must be disposed of by distillation. Transalkylation apparently does take place, however, in the case of aryl aliphatic ethers such as, for example, a complex of boron fluoride and anisole. The use of a phenol complex has the additional advantage that due to the transalkylation, the alkylated phenol which was a portion of the complex may be recycled to the alkylation zone for alkylation to be used in preparing other quantities of the dienone.

The boron fluoride complex, while in the nature of a catalyst, also takes part in the reaction. The minimum quantity of the boron fluoride complex to be added to the reactants depends upon the reacting conditions, mole ratios of boron fluoride phenol complex to dienone of from 1:5.2 (Example VII) to 1:12 (Example VIII) can be conveniently used but preferably a ratio of one mole of boron fluoride phenol complex to six moles of the dienone is advantageously used, as two molecules of phenol are included in the complex with one molecule of boron trifluoride and since one alkyl group is removed from each dienone molecule, this permits the transalkylation process to alkylate the phenol to a trialkylated product.

The dealkylation reaction is advantageously carried out at a temperature of between room temperature and 50° C. The dealkylation reaction is exothermic, and at temperatures higher than 50° C. the formation of undesirable by-products is accelerated. At temperatures below room temperature, the rate of reaction is so slow as not to give a desirable yield of the nitro phenol. The reaction may readily be carried out at atmospheric pressure although higher or lower pressures may be used without deleterious effects. Since the reaction temperature may be controlled by employing a solvent whose boiling point is at the temperature desired for carrying out the reaction so the exothermic heat of reaction is removed by evaporation of the solvent, the pressure can be raised or lowered so as to control this temperature at which the solvent boils.

The invention will be illustrated further by the following examples.

EXAMPLE I

Phenol (948 grams, 10 moles), 500 milliliters of benzen, and 47 grams of concentrated sulfuric acid were introduced into a five-liter flask equipped with stirrer, thermometer, condenser with attached mercury-filled bubble counter, and gas inlet tube. A total of 1790 grams of isobutylene (1680 grams is the theoretical quantity required) was bubbled into and absorbed by the mixture at 50° C. Next, 3.5 liters of benzene was added to dissolve the solid product, and the mixture was refluxed with 50% excess sodium hydroxide solution for two hours. The aqueous layer was removed and the organic layer was washed several times with water. The residual water and benzene was removed by distillation, final distillation being in a column at pressures of 20 millimeters of Hg. As the last of the benzene was removed, the product began to debutylate and isobutylene was collected in the Dry Ice trap. The distillation was stopped and the residue was recrystallized from 95% ethanol. A total of 1867 grams (71%) of 2,4,6-tri-t-butylphenol, M.P. 130–131° C., was isolated.

A four-liter suction flask was charged with 320 grams (1.22 mole) of 2,4,6-tri-t-butylphenol and 1600 milliliters of glacial acetic acid. Next 160 milliliters of concentrated nitric acid was added all at once, and the mixture was shaken with tap water cooling (20–25° C.). The product precipitated and was filtered. It was washed with 1 liter of 0.2 N sodium hydroxide solution and then with water and amounted to 293 grams (78.2%). The nitration was then repeated with the original solvent mixture, with the addition of 120 milliliters of nitric acid. The product amount to 330 grams (96.5%) of 2,4,6-tri-t-butyl-4-nitro - 2,5 - cyclohexadiene-1-one. The foregoing procedure was repeated with similar results.

A solution of 622.7 grams (2.03 mole) of the dienone in 2000 milliliters of hexane in a five-liter flask was treated with 73 milliliters (0.348 mole) of boron fluoride phenol complex all at once. The temperature rose rapidly to 54° C. with the evolution of some brown fumes. (Keeping the exotherm below 50° C. eliminates the gas evolution.) The flask was cooled to 49° C. with ice water and then the mixture was stirred for two hours while being allowed to cool. The crude 2,6-di-t-butyl-4-nitrophenol was filtered, washed with hexane and amounted to 461 grams (90.7%) M.P. 152–157° C.

EXAMPLE II

The procedure of Example I was repeated five times so that about 10 liters of reaction medium hexane was obtained from the series of dealkylations of the dienone. The volatile matter was distilled off on a steam bath until about one liter of residue remained. This residue was filtered and 152 grams of 2,6-di-t-butyl-4-nitrophenol was isolated from the residue on the filter. The filtrate, on the other hand, was flash-distilled and 519 grams of material, B.P. 54–150° C. at 2 millimeters, was obtained as distillate. Infrared analysis of this material indicated that 72% of it was di-t-butylphenol. The distillate was dissolved in hexane and extracted with 30% Claisen alkali. The alkali solution was acidified, extracted with hexane, and the hexane solution concentrated. The residue which weighed 465 grams was distilled; and the fraction, B.P. 76–94° C. at 4 millimeters was recrystallized from hexane at Dry Ice temperature. From this one recrystallization, 170 grams of 2,4-di-t-butylphenol having a melting point of 53–54° C. (Lit. 56.5° C.) was isolated.

EXAMPLE III

A mixture of 76.5 grams (0.25 mole) of dienone and 250 milliliters of hexane was treated with 8.75 milliliters of boron fluoride phenol complex. The temperature rose from 18° C. to 47° C. despite ice water cooling. After ten minutes of stirring, the product was filtered and amounted to 57.1 grams (91.0%), M.P. 152–157° C.

EXAMPLE IV

To a 1000 milliliter flask equipped with a stirrer, thermometer, and reflux condenser was added 76.5 grams (0.25 mole) of 2,4,6-tri-t-butyl-4-nitro-2,5-cyclohexadiene-1-one at room temperature. Stirring was started and 10.65 grams of $BF_3.2C_6H_5OH$ was added. The temperature rose to 37° C. and the product precipitated almost at once. Stirring was continued for 1.5 hours. Extraction with 400 milliliters of 1 N NaOH and then with 100 milliliters of 1 N NaOH and acidification of the aqueous extract gave 59.1 grams (94.2%) of product, M.P. 147–156° C. The hexane, on evaporation, left a dark oil wihch amounted to 23.2 grams. This oil contained 56% of 2,4-di-t-butylphenol; no 2,6-di- or 2,4,6-tri-t-butylphenol was found. The amount of 2,4-di-t-butylphenol corresponds to a 65.5% yield based on the phenol in the complex and a 50.3% yield based on the isobutylene removed from the dienone.

In a continuous operation in which the phenol is alkylated at an alkylation zone the alkylated phenol is nitrated at a nitration zone and the dienone is dealkylated at a dealkylation zone, the alkylated phenol from the dealkylation zone is recycled to the alkylation.

EXAMPLE V 2,4,6-tri-t-butyl-4-nitro-2,5-cyclohexadiene-1-one (7.65 grams, 0.025 mole) in 75 milliliters hexane in a 100 milliliter flask equipped with stirrer, thermometer, and reflux condenser was treated with 0.875 milliliter (1.065 gram, 0.00418 mole) of $BF_3.2C_6H_5OH$. The temperature rose to 28° C. The first precipitate formed after ten minutes. Stirring was continued for one hour at the end of which time the product was isolated by extraction with 1 N NaOH and acidification to a pH of about 6 with nitric acid. The dark tan solid (crude 2,6-di-t-butyl-4-nitrophenol) amounted to 3.1 grams (49.2%), M.P. 130–153° C.

EXAMPLE VI

The procedure of Example V was repeated except that the flask was surrounded by a heating mantle. The exotherm caused the temperature to rise to 36° C. and it slowly dropped to 26° C. over a period one hour. The precipitate formed within one minute. The nitro phenol amounted to 5.6 grams (85%), M.P. 147–155° C.

EXAMPLE VII

The procedure of Example VI was repeated except that 1.00 milliliter of $BF_{3.2}C_6H_5OH$ was used. The temperature rose to 41° C. and the precipitate formed almost immediately. After stirring for one hour, the flask was opened and the content still fumed. A tan solid, 6.2 grams (98.8%), of 2,6-di-t-butyl-4-nitro phenol (M.P. 151–157° C.) was produced.

EXAMPLE VIII

The procedure of Example V was repeated except that the amount of complex was reduced to one half (0.44 milliliter of $BF_{3.2}C_6H_5OH$). The temperature rose to 31° C. and heating brought it to 36° C. It was allowed to cool slowly during a period of one hour of stirring. After one hour, no precipitate had formed but some brown fumes were evolved during the reaction. Extraction with base and acidification gave 1.8 grams of tan solid (28.7%) M.P. 135–153° C.

EXAMPLE IX

A solution of 3.06 grams (0.01 mole) of 2,4,6-tri-t-butyl-4-nitro-2,5-cyclohexadienone in 30 milliliters of hexane to which 10 drops of boron fluoride-etherate had been added was heated slowly to 55° C. Heating at this temperature was continued for one hour. Extraction with 1 N NaOH and acidification gave 1.0 gram (39.9%) of 2,6-dibutyl-4-nitro phenol, M.P. 145–153° C.

EXAMPLE X

A solution of 3.06 grams (0.01 mole) of 2,4,6-tri-t-butyl-4-nitro-2,5-cyclohexadiene-1-one in 30 milliliters of hexane was treated with one drop of boron fluoride-phenol complex. The mixture was heated for ten minutes at 42° C. and ten minutes at 50° C. It turned dark and "nitrous fumes" were evolved. The solution was extracted with 1 N NaOH and the basic solution was acidified to yield 0.1 gram of yellow solid, crude 2,6-di-t-butyl-4-nitro phenol, M.P. 125–152° C.

EXAMPLE XI

There was dissolved 18.5 grams (0.060 mole) of 2,4,6-tri-t-butyl-4-nitro-2,5-cyclohexadienone in 150 milliliters of hexane and to this was added a solution of boron trifluoride, 0.6 gram (0.01 mole) in m-cresol, 6.55 grams (0.061 mole). This mixture was stirred for one hour and a maximum temperature of 41° C. was observed. The reaction mixture was cooled to 10° C. and filtered to obtain 2,6-di-t-butyl-4-nitro phenol, 12.4 grams, having a melting point of 152–154° C., as a black-purple solid. When a small portion of this solid was dissolved in base and precipitated by acidification, it gave a yellow solid, melting point 155–157° C. (melting point of mixture with an authentic sample of 2,6-di-t-butyl-4-nitro phenol, 155–157° C.). The filtrate from the reaction mixture was extracted with 5% base (100 milliliters); and acidification of this extract gave 3.4 grams of crude solid, melting point 130–140° C. which upon being dissolved in hexane and recrystallized therefrom gave 2.5 grams, melting point 155–157° C. (total 98% yield).

The solution which had been subjected to the extraction was concentrated by steam distillation to 9.3 grams, and analysis of this residue by infrared spectrometry indicated the presence of 69% 6-t-butyl-3-methylphenol and 6% 4,6-di-t-butyl-3-methylphenol.

EXAMPLE XII

The process of Example XI was repeated except that a solution of boron trifluoride in beta naphthol was substituted for the boron trifluoride in meta-cresol. Similar results were obtained.

Boron trifluoride, although only one of those groups of materials which readily form complexes with phenols, is unique in that it causes a substantially quantitative dealkylation of the dienone, as will be apparent from the following Example XIII.

EXAMPLE XIII (a) A mixture of 2,4,6-tri-t-butyl-4-nitro-2,5-cyclohexadienone, 20 g. (0.065 grams), phenol, 3 grams (0.033 mole) and aluminum chloride, 1.44 grams (0.017 mole) in hexane, 100 milliliters, was heated at 40–46° C. for one hour. The reaction mixture was cooled to 10° C. and filtered. A small amount of black precipitate was isolated which decomposed to a red oil upon washing with water. The hexane filtrate was extracted with 10% sodium hydroxide solution (50 milliliters). Acidification of the base extract gave a small amount of solid, 0.5 gram, upon filtration. The solid was partially dissolved in 100 milliliters of hot hexane and filtered. The filtrate upon concentration gave a trace, 0.1 gram, of a yellow-brown solid, melting point 153–156° C., mixed melting point with 2,6-di-t-butyl-4-nitro phenol, 153–156° C. The original hexane solution, upon concentration, gave a purple solid, 14 grams, melting point 80–84° C., which appeared to be a mixture of 3,5-di-t-butyl-1,2-benzoquinone and tri-t-butylphenol.

(b) A mixture of 2,4,6-tri-t-butyl-4-nitro-2,5-cyclohexadienone, 20 grams (0.065 mole) and aluminum chloride, 144 grams (0.01 mole) in benzene, 100 milliliters, was heated at 40–56° C. for 1.5 hours. The black reaction mixture was cooled to 10° C. and filtered. A small amount of solid was obtained which decomposed to a black oil upon contact with water. The filtrate was extracted with 10% sodium hydroxide solution (100 milliliters). The base extract upon acidification and filtration gave a yellow-brown solid, 2.6 grams, melting point 115–143° C. Recrystallization of this material from hexane gave a yellow solid, 1.2 grams, melting point 155–157° C. (melting point of a mixture of this with an authentic sample of 2,4-di-t-butyl-4-nitro phenol 155–157° C.) or a yield of 7%.

(c) A mixture of 2,4,6-tri-t-butyl-4-nitro-2,5-cyclohexadienone, 20 grams (0.065 mole) and zinc chloride, 1.5 grams, in benzene, 100 milliliters, was heated at 40–45° C. for two hours. The reaction mixture was cooled to 10° C. and filtered. Only a small amount of a black solid was isolated which decomposed upon contact with water. The hexane solution was extracted with 10% sodium hydroxide solution (100 milliliters). Acidification of this base extract gave no water-insoluble solid.

(d) When experiment (c) was carried out again, but substituting hexane for the benzene and adding 0.5 equivalent of phenol, no base-soluble, water-insoluble material corresponding to 2,6-di-t-butyl-4-nitro phenol was isolated.

The foregoing has presented a novel process for the production of 2,6-dialkyl-4-nitro phenol.

What is claimed is:

1. A process for producing 2,6-dialkyl-4-nitro phenol which comprises dissolving 2,6-dialkyl-4-tertiary alkyl-4-nitro-2,5-cyclohexadiene-1-one in an inert solvent in which 2,6-dialkyl-4-nitro phenol is insoluble and adding a complex of boron fluoride and a member selected from the group consisting of phenol, cresol, xylenol and diethyl ether thereto in mole ratios of complex to the dienone of from 1:5.2 to 1:12, whereupon an exothermal reaction occurs and 2,6-dialkyl-4-nitro phenol precipitates, and recovering this precipitate.

2. A process for producing 2,6-dialkyl-4-nitro phenol which comprises dissolving 2,6-dialkyl-4-tertiary alkyl-4- nitro-2,5-cyclohexadiene-1-one in an inert solvent in which 2,6-dialkyl-4-nitro phenol is insoluble and adding a complex of boron fluoride and phenol thereto in mole ratios of complex to the dienone of from 1:5.2 to 1:12, whereupon an exothermal reaction occurs and 2,6-dialkyl-4-nitro phenol precipitates, and recovering the precipitate.

3. The process of claim 2 wherein the solvent is hexane.

4. A process for producing 2,6-dialkyl-4-nitro phenol which comprises dissolving 2,6-dialkyl-4-tertiary alkyl-4-nitro-2,5-cyclohexadiene-1-one in an inert solvent in which 2,6-dialkyl-4-nitro phenol is insoluble and adding a complex of boron fluoride and diethyl ether thereto in mole ratios of complex to the dienone of from 1:5.2 to 1:12, whereupon an exothermal reaction occurs and 2,6-dialkyl-4-nitro phenol precipitates, and recovering the precipitate.

References Cited by the Examiner
UNITED STATES PATENTS 2,403,748   7/46   Olin _____ 260—623

OTHER REFERENCES

Albert et al.: Jour. Amer. Chem. Soc., 76:4979–82 (1954) (4 pages).

Ley et al.: Berichte deut. Chem., 89:1402–12 (1956) (11 pages).

LEON ZITVER, *Primary Examiner*.

CHARLES B. PARKER, *Examiner*.